April 2, 1963   W. N. BAINBRIDGE ETAL   3,083,937
AEROPLANE UNDERCARRIAGES
Filed Jan. 25, 1960   2 Sheets-Sheet 1

Inventors:
William N. Bainbridge
Thomas C. Campbell
Bernard O. Heath
By: Stevens, Davis, Miller & Mosher, Attorneys

3,083,937
AEROPLANE UNDERCARRIAGES

William Norman Bainbridge, Lytham St. Annes, Thomas Cochrane Campbell, St. Annes-on-Sea, and Bernard Oliver Heath, Preston, England, assignors to The English Electric Company Limited, London, England, a British company
Filed Jan. 25, 1960, Ser. No. 4,512
Claims priority, application Great Britain Feb. 5, 1959
4 Claims. (Cl. 244—102)

The present invention relates to an aeroplane main undercarriage co-operating with any conventional nose wheel.

Aeroplane undercarriages are required during the take-off and landing run to take a load vertical to the ground caused by the weight of aeroplane, to resist side loads due to cross winds and yaw, and also to provide stabilisation of the aeroplane should it tend to roll or to pitch on the ground. For running at speed over rough ground the load carrying suspension should be relatively soft, that is to say, of low natural frequency. For pitch stabilisation the natural frequency and stiffness may be required to be different depending upon the position of the main wheels and nose wheels relative to the center of gravity. The main undercarriage is required to be just aft of the center of gravity in order to ensure that the nose wheel touches down on landing, but not too far aft in order to ensure that the nose wheel of the aeroplane may be pulled off the ground quickly during the take off run. For stabilisation in roll, the natural frequency and stiffness of the suspension may also be required to be different from that of the main vertical load bearing component of the undercarriage.

According to the present invention, the main wheels are journalled in tandem arrangement in two closely spaced groups on both ends of a beam pivoted at one end to one end of an extensible oleo strut slidable in a frame, which is rotatable about a transverse pivot axis on the aeroplane structure and on which frame a two-armed lever is pivoted one arm of said lever being articulated to the upper end of said extensible oleo strut and its other arm being articulated through a shock absorber strut to the said beam, the upper end of said extensible oleo strut being also linked to the aeroplane structure by a rigid radius rod.

The pivot axle of the said two armed lever on the said rotatable frame is braced in the lowered position of the undercarriage against a joint on the aeroplane structure by two links articulated to one another and forming with each other a self-breaking strut, the centers of the joints of said links lying on a straight line in the lowered position of the undercarriage which line is broken by a jack or actuator engaging on the aeroplane structure and on one of the said links when retracting the undercarriage; then through the action of the said radius rod the said extensible oleo strut is shortened and the said beam is swung into a position in which the center of the said transverse pivot axis of the rotatable frame and the centers of the two axles of the main wheels lie substantially on a straight line.

Auxiliary outrigger wheels may be attached each by a rigid strut with articulated parallelogram linkage arrangement to the said rotatable frame, a shock absorber articulated by universal joints to said strut and to aeroplane structure acting as a radius rod until a position of the said strut parallel to the plane of symmetry of the aeroplane is reached and then being compressed by the final retraction of the said frame.

The whole undercarriage described is suspended on the center line of the fuselage just aft of the center of gravity of the aeroplane and in operation takes the main vertical load or weight of the aeroplane and side loads with a suspension designed to be suitable for running at speed over rough surfaces. This undercarriage operates in conjunction with a conventional steerable nose wheel to provide the required stabilisation characteristics in pitch and to provide steering.

The said auxiliary wheels act as outriggers to provide the required stabilisation of the aeroplane when running over rough ground.

In order that the invention may be clearly understood, and readily carried into effect an embodiment thereof will now be described by way of example with reference to the accompanying drawings, in which.

Figure 1:
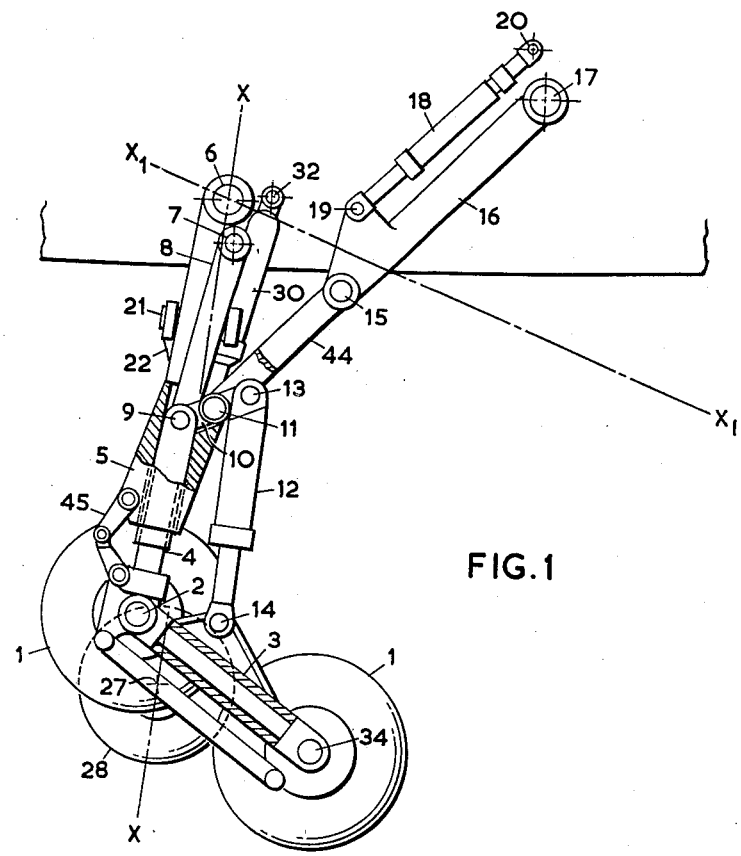
FIG. 1 is a side elevation of the new undercarriage, partly in section, in the lowered position.

Referring to FIG. 1 a rotatable frame 5 is pivotally attached to the aeroplane structure (not shown in detail) on a pivot axis 6 which is transverse to the vertical plane of symmetry of the aeroplane. An extensible oleo strut 4 is slidably mounted as a whole in the center of the said retractable frame 5 and restrained from turning relative to the latter by the usual shackles 45. At the lower end of the oleo strut 4 a transverse axle 2 is mounted which carries four main landing wheels 1 closely spaced side by side and about which a beam 3 is pivoted which carries at its free end another transverse axle 34 with four more main landing wheels 1 closely spaced side by side.

To this beam 3 the lower end of a shock absorber strut 12 of the liquid spring type is articulated by a pivot pin 14, the other end of which shock absorber strut is articulated by a pivot pin 13 to a two-armed lever 10 which is hinged on a transverse pivot axle 11 to the frame 5. The other end of this lever 10 is pivotally attached by a pivot pin 9 to the upper end of the said extensible strut 4 and to the lower end of a rigid radius rod 8. The latter is pivotally attached at its upper end by a pivot axle 7 to the aeroplane structure (not shown in detail).

The oleo strut 4, beam 3, shock-absorber strut 12 and two-armed lever 10 form an articulated quadrilateral, of which the lever 10 is pivotally mounted on the frame 5, and the oleo strut 4 is slidable as a whole in said frame 5. The static attitude of said quadrilateral relative to said frame 5 is controlled in the fore-and-aft plane by the rigid radius rod 8 the pivot point 7 of which is offset from the pivot point 6 of said fram 5 so that, when said frame 5 is raised, said articulated quadrilateral and the main wheels 1 journalled on said beam 3 take up a minimum of space, lying within the lower part of said aircraft fuselage, while changing both in attitude and in their distance from said frame 5.

On the said pivot axle 11 moreover the lower end of a link 44 is pivoted, the upper end of which is pivotally attached by the pivot axis 15 to the lower end of a link 16 the upper end of which is pivotally attached by a pivot axis 17 to the aeroplane structure (not shown in detail), the two links 44, 16 forming together a self-breaking strut. A servo-motor 18 is pivotally attached by axis 19 to the said strut 16 and at its other end at 20 to the aeroplane structure. In the lowered position of the undercarriage the joints 11, 15 and 17 of the links 44, 16 are on a straight line.

Figure 2:
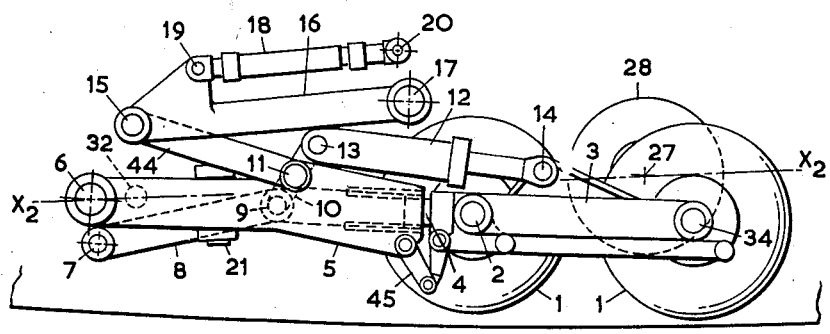
FIG. 2 is a side elevation in the retracted position.

For retracting the undercarriage into the position shown in FIG. 2 the servo-motor 18, which may be a hydraulic or pneumatic jack or an electrical actuator, is contracted, and the links 16 and 44 are folded about the joint 15. The frame 5 is thereby swung about the axle 6, and the radius rod 8 swings the lever 10 about its axle 11 on the frame 5 thereby through the shock absorber 12 turning the beam 3 into a position in which the centers of the axles 34 and 2 are substantially on one straight line with the center of the axle 6, and the whole main undercarriage accordingly occupies the minimum space, as clearly shown in FIG. 2. The extensible oleo strut 4 has contracted in this movement.

Figure 3:
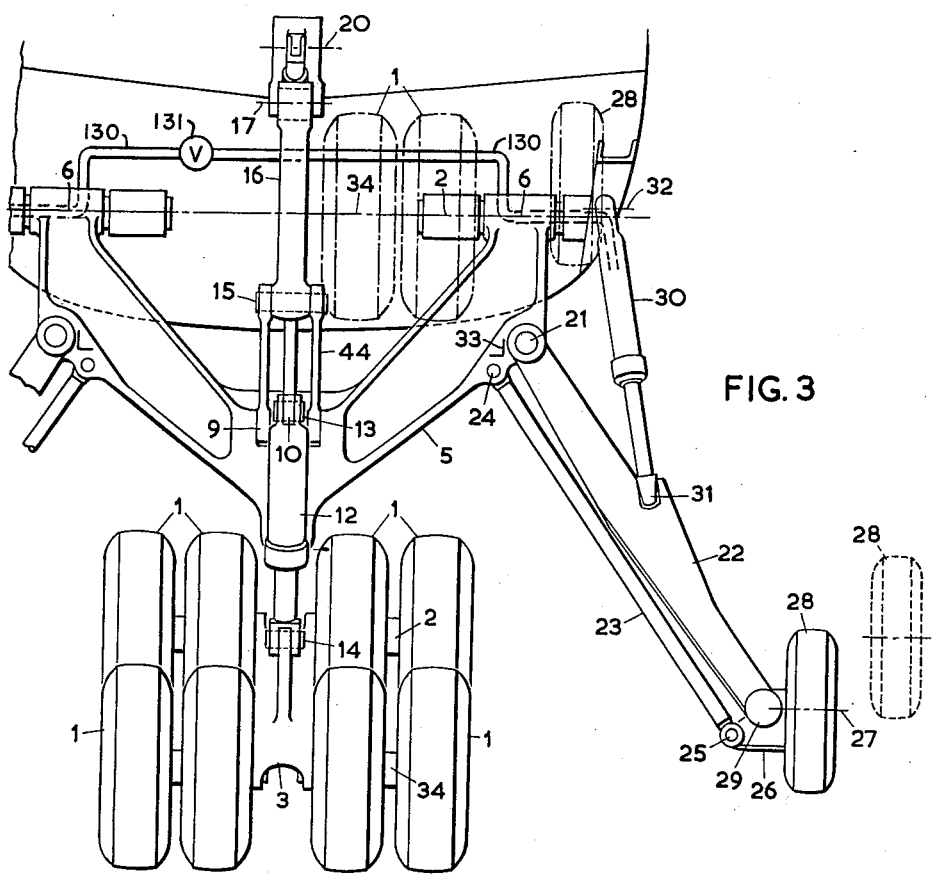
FIG. 3 is an elevation from the rear, corresponding to FIG. 1 in full lines, and diagrammatically corresponding to FIG. 2 in chain-dotted lines, and to a deflected position of an outrigger in dotted lines.

Referring now to FIG. 3, the rigid struts 22 are pivotally attached by longitudinal pivot axles 21 to the said rotatable frame 5. A bracket 26 is pivotally attached to the lower end of each strut 22 by a pivot axle 29, and an articulated parallelogram is completed by a rod 23 pivotally attached at 24 to the said frame 5 and at 25 to the said bracket 26. An outrigger wheel 28 is journalled on the said bracket 26 about an axle 27 parallel to the axles 2 and 34 of the main landing wheels 1.

A shock absorber strut 30, preferably of the liquid spring type is attached at its upper end by a universal joint 32 to the aeroplane structure (see also FIG. 1). The aforesaid articulated parallelogram ensures that the parallelism of the axle 27 to the axles 2 and 34 is kept when the strut 22 turns about its pivot axis 21 and the wheel 28 moves to the position shown in FIG. 3 in dotted lines when the strut 22 acts as an outrigger, or to the position shown in chain-dotted lines in FIG. 3 and in full lines in FIG. 2, when the outrigger wheel 28 is retracted.

This is effected in the following manner:

On rotation of the frame 5 about its axis 6 the strut 30 acts as a radius rod controlling the swing of the rigid strut 22 about its pivot axis 21. The rate of the in-swing of the strut 22 on retraction of the frame 5 is determined by the position of the universal joint 32 and the extended length of the radius rod 30, while the total amount of in-swing is determined by a stop 33 provided on the frame 5 which is so positioned that the end of the in-swing is reached when the lines 21—29 and 24—25 have become parallel to the plane of symmetry of the aeroplane. This position is reached when the undercarriage has rotated from the position X—X (FIG. 1) to the position $X_1$—$X_1$ at the beginning of the retraction of the frame 5. Upon further retraction of the frame 5, the in-swing of the strut 22 has ceased owing to its abutting the stop 33 on frame 5, and the extensible strut 30 is compressed until the fully retracted position $X_2$—$X_2$ (FIG. 2) is reached. This compression of strut 30 and abutting of the strut 22 on the stop 33 act as a position lock for the strut 22.

It will be seen from FIG. 2 and the position of wheel 28 shown in FIG. 3 in chain-dotted line, that the outrigger wheel in the fully retracted position lies closely to the main wheels 1, and that the whole undercarriage occupies a minimum of space.

The lowering of the undercarriage takes place in the inverse sequence. It will be noted that at the landing run of the aeroplane on touching down the four main wheels 1 journalled on the axle 34 contact the ground first turning the beam 3 about the axle 2, until all eight wheels 1 carry the load. The extensible oleo strut 4 and shock absorber strut 12 and the lever 10 provide the mobility in parallel to the plane of symmetry of the aeroplane. The lowered position of the frame 5 is secured by the pivot centers 11, 15 and 17 of the self-breaking strut 44, 16 lying all on a straight line. The springing is effected by the extensible oleo strut 4 and the shock absorber strut 12.

The springing of the wheels 28, when they touch the ground as outriggers, is effected by their shock absorber struts 30.

According to a development of the invention the suspensions of the two outriggers may be interconnected hydraulically by a line 130 containing a control valve 131, or mechanically to enable their stiffness and other characteristics to be varied depending upon whether one or both of the outriggers are touching the ground, thereby achieving further improvements in roll stability of the aeroplane when running on the ground.

The characteristics of the new undercarriage may be summed up as follows:

(1) It enables the separation of the main vertical and side load bearing function from the roll stabilisation and from the pitch stabilisation functions.

(2) This enables different spring rates and suspension characteristics to be chosen for each function but some components of vertical and side loads may be taken by the nose wheel and outriggers when pitching or rolling.

(3) The undercarriage can be placed under the fuselage near the center of gravity of the aeroplane, thus avoiding additional aeroplane structure or wing strengthening otherwise required in order to take undercarriage loads.

(4) The main wheels and outriggers fit conveniently into the lower section of the fuselage and are therefore suitable for thin wing high speed aeroplanes.

(5) When in contact with the ground, the track of the outriggers tends to widen thus within limits, thereby improving roll stability. As mentioned hereinabove, the suspensions of the two outriggers may be interconnected either hydraulically or mechanically to enable their stiffness and other characteristics to be varied depending upon whether one or both of the outriggers are touching the ground thereby achieving further improvements in roll stability.

(6) Apart from the jack or actuator for the retraction of the undercarriage all the components used for retraction are also used as load carrying members when the undercarriage is extended, hence saving space and weight.

What we claim as our invention and desire to secure by Letters Patent, is:

1. An aeroplane undercarriage for co-operation with a conventional nose wheel, comprising in combination: an aeroplane structure, a frame hinged on said structure about a first transverse axis, an oleo strut slidably mounted in the said frame, a beam hinged at its front end to the lower end of said oleo strut about a second transverse axis, a group of wheels journalled side by side on said beam co-axially with said second transverse axis, another group of wheels journalled side by side at the rear end of said beam about a third transverse axis, a two-armed lever pivotally mounted on said frame about a fourth transverse axis, an extensible shock absorber strut articulated at its top end to one arm of said two-armed lever and at its bottom end to said beam at a point intermediate said second and third transverse axes, and a rigid radius rod hinged to the said aeroplane structure adjacent the said first transverse axis and articulated to the second arm of said two-armed lever and to the top end of the said oleo strut, two links articulated to one another, and at their free ends respectively to the said aeroplane structure and to the said frame about the said fourth transverse axis, the said two links forming together a self-breaking strut, the centers of articulation of the said links to the aeroplane structure and to one another in the lowered position of said undercarriage lying on a straight line with the said fourth transverse axis, and an undercarriage servomotor hinged to the said aeroplane structure and to one of the said links, folding the said self-breaking strut when retracting said undercarriage.

2. An aeroplane undercarriage for co-operation with a conventional nose wheel, comprising in combination: an aeroplane structure, a frame hinged on said structure about a first transverse axis, an oleo strut slidably mounted in the said frame, a beam hinged at its front end to the lower end of said oleo strut about a second transverse axis, a group of wheels journalled side by side on said beam co-axially with said second transverse axis, another group of wheels journalled side by side at the rear end of said beam about a third transverse axis, a two-armed lever pivotally mounted on said frame about a fourth transverse axis, an extensible shock absorber strut articulated at its top end to one arm of said two-armed lever and at its bottom end to said beam at a point intermediate said second and third transverse axes, and a rigid radius rod hinged to the said aeroplane structure adjacent the said first transverse axis and articulated to the second arm of said two-armed lever and to the top end of the said oleo strut and a retraction jack for said undercarriage, said rigid radius rod being shorter than the spacing between said first and fourth transverse axes, contracting said oleo leg into said frame when said undercarriage is retracted by said retraction jack, said first, second and third transverse axes being arranged on a straight line in the retracted position of said undercarriage.

3. An aeroplane undercarriage for co-operation with a conventional nose wheel comprising in combination: an aeroplane structure, a frame hinged on said structure about a first transverse axis, an oleo strut slidably mounted in the said frame, a beam hinged at its front end to the lower end of said oleo strut about a second transverse axis, a group of wheels journalled side by side on said beam co-axially with said second transverse axis, another group of wheels journalled side by side at the rear end of said beam about a third transverse axis, a two-armed lever pivotally mounted on said frame about a fourth transverse axis, an extensible shock absorber strut articulated at its top end to one arm of said two-armed lever and at its bottom end to said beam at a point intermediate said second and third transverse axes, and a rigid radius rod hinged to the said aeroplane structure adjacent the said first transverse axis and articulated to the second arm of said two-armed lever and to the top end of the said oleo strut, two rigid outrigger struts articulated at their upper ends symmetrically to said frame each about a longitudinal axis, brackets articulated to the lower end of each of said outrigger struts, outrigger wheels journalled on each of said brackets, two rods each linked at one end to said frame and at the other end to one of said brackets the articulation points of each rigid outrigger strut and associated rod on said frame and on the associated brackets forming an articulated parallelogram linkage, and two extensible shock absorber struts having universal joints at their ends articulated to each of said rigid outrigger struts and adjacent the said first transverse axis to said aeroplane structure, respectively.

4. An aeroplane undercarriage for co-operation with a conventional nose wheel, comprising in combination: an aeroplane structure, a frame hinged on said structure about a first transverse axis, an oleo strut mounted as a whole slidably in said frame, a beam hinged at its front end to the lower end of said oleo strut about a second transverse axis, a group of wheels journalled side by side on said beam co-axially with said second transverse axis, another group of wheels journalled side by side at the rear end of said beam about a third transverse axis, a two-armed lever pivotally mounted on said frame about a fourth transverse axis, a shock absorber strut articulated at its top end to one end of said two-armed lever and to said beam at a point intermediate said second and third transverse axes, said oleo strut being articulated at its top to the other arm of said two-armed lever, said oleo struts, two-armed lever, shock absorber strut and beam forming together an articulated quadrilateral, a rigid radius rod pivoted to said structure at a point offset from said first transverse axis at one end and to said quadrilateral at the other end and controlling the attitude of said quadrilateral relative to said structure and the position of said oleo strut as a whole relative to said frame thus causing said quadrilateral and wheels to change attitude and position relative to said frame when the undercarriage is raised and lowered.

References Cited in the file of this patent

UNITED STATES PATENTS

| | | |
|---|---|---|
| 2,621,004 | Ashton et al. | Dec. 9, 1952 |
| 2,792,998 | Dowty | May 21, 1957 |
| 2,909,342 | Maltby | Oct. 20, 1959 |

FOREIGN PATENTS

| | | |
|---|---|---|
| 650,547 | Great Britain | Feb. 28, 1951 |
| 1,212,900 | France | Oct. 9, 1958 |